United States Patent Office 2,839,469
Patented June 17, 1958

2,839,469
ANTI-WEAR OIL COMPOSITIONS

Paul E. Pfeifer, Crystal Lake, and Kenneth Boldt, Cary, Ill., assignors to The Pure Oil Company, Chicago, Ill., a corporation of Ohio No Drawing. Application December 29, 1954
Serial No. 478,502

9 Claims. (Cl. 252—32.7)

This invention relates to a mineral oil composition for use as a crankcase oil in the lubrication of automobile engines. It is also concerned with a lubricating oil formulation which has minimum adverse effects on engine preignition characteristics.

The modern automobile engine is a high-output, high-efficiency, compact machine, generally of the overhead valve type, which places a considerable demand on engine lubricating oils because of the multifunctional requirements necessary for good performance. These engines have a plurality of closely fitted, metallic surfaces in direct, high-speed moving contact with other metallic surfaces. This makes lubrication the primary requirement of the oil in order that the engine parts, some of which are heavily loaded, may be maintained in reasonably good operating condition. Such mechanical elements of the engine as piston rings and cylinder walls, and the component parts of the valve train, such as camshaft lobes, cam followers or hydraulic valve lifters, rocker-arm shafts and bearings, oil pump, distributor drive-gear, etc., have small clearance between the co-operating parts of the mechanical combination in which these elements are used. Although such mechanical units have been conventionally used in engine design, the more severe service conditions under which these units operate in the high-output engine are conducive to greater wear. The problem of lubrication is further complicated by the independent design of automobile engines by automobile manufacturers, who select combinations of materials of construction, surface treatment, and mechanical elements which they feel give the best results for each respective type of engine. Increased unit loading of such elements as the cam lifter, and rocker-arm, made necessary because of the high speed of operation of the engine, coupled with a variety of geometrical shapes and metallurgy of valve trains in various engines, have created a unique wear problem. This problem includes scuffing, spalling and wear of lifter and cam shafts. The spalling of the lifter appears to be the result of fatigue of a thin layer of material on the face of the lifter causing bits of metal to be lost from the surface. Other failures occur because of high wear with the wearing surfaces being worn smooth. Results of wear vary from noisy operation, due to the loss of the original geometry of the cam and mating lifter surfaces, to complete removal of cam lobes. Lubrication of these elements of the engine is effected by means of a phenomenon known as "boundary lubrication."

The problem of lubricating automobile engines is further complicated by the preignition occurrence in the combustion chamber of the engine. This combustion phenomenon, which is to be distinguished from common knocking, is promoted by the presence of engine deposits because these deposits will glow and set off the abnormal fuel combustion before or after the occurrence of the spark. Inasmuch as some of the engine deposits result from a portion of the lubricating oil being ignited in the combustion chamber, it is desirable that any lubricating oil which is formulated for use in lubricating engines have a minimum tendency to form deposits under these combustion conditions.

A large number of test procedures have been developed to investigate the phenomena of boundary lubrication and to rate the degrees of oiliness of an oil. Problems arise in such studies and evaluations because of the difficulties encountered in measuring oiliness properties and because of the contrary results obtained by the use of different equipment or by varying the experimental procedure. It is to be noted that no standardized method of measuring lubricating properties directly has been established by the American Society for Testing Materials. The only satisfactory manner in which this characteristic of a lubricating oil can be determined is to actually test the oil under service conditions in the crankcase of an automobile engine. Heretofore, not much concern has been given to the oiliness properties of lubricating oils used in automobile engines antedating the high-output, high-efficiency engine because it is a matter of fact that for ordinary internal combustion engines conventional petroleum oils have been found to possess an adequate degree of oiliness. Although a number of oiliness agents have been developed and it is known that such agents are helpful when conditions of boundary lubrication are met, it has been conventional practice to eliminate the use of oiliness or anti-wear agents from engine lubricating oils because their indiscriminate use is not always warranted or desirable.

In the lubrication of engines, lubricating oils must flow through small passageways and oil holes to areas requiring lubrication. Sludge and varnish deposits resulting from the oxidation characteristics of lubricating oils have a tendency to prevent the free flow of oil in the lubrication system of the engine. To help overcome the deleterious effects resulting from the formation of consolidated deposits on the pistons, behind the rings, or in the crankcase, detergents are normally included in lubricating oil formulations to reduce the tendency of varnish and sludge to form adherent deposits. The addition of the detergent to the engine lubricating oil is, therefore, beneficial and essential for maintaining engine cleanliness. Crankcase oils are formulated so that the detergency capacity or level is sufficient to mitigate the agglomeration and deposition of soot, dirt, and oxidation products, under normal operating conditions, between oil changes. However, it has been found that at this detergency level detergents present in engine lubricating oils have a deleterious effect on the inherent anti-wear characteristics of the oil.

The amount of detergent added is, in general, the approximate amount necessary to pass the detergency requirements of the Military Specification MIL-L-2104A test, but higher or lower amounts may be present, depending on the engine characteristics, base oil, etc. In this test, the effect of engine oil on ring-sticking, wear, and accumulation of deposits is determined using the Coordinating Research Council's L-1-545 test procedure. This procedure is described in CRC Handbook, Coordinating Research Council, Inc., 1946. In essence, this test consists of using a special one-cylinder diesel engine operating on a straight-run fuel which must conform to a number of requirements. A minimum sulfur content of 0.35 weight percent is required. This level of detergency will hereinafter be referred to as a "high level of detergency."

The inimical influence of detergency level on wear characteristics is illustrated by the following data which were obtained using the Chevrolet test, which is hereinafter described in detail:

EFFECT OF DETERGENT ON WEAR OF HYDRAULIC VALVE LIFTERS

| Lubricant | Condition of Hydraulic Valve Lifters | |
| --- | --- | --- |
| | Failed | Incipient Failure |
| Base oil [1] | 0 | 1 |
| Base oil + 3 wt. percent Detergent [2] | 6 | 0 |

[1] Mid-Continent, solvent-refined lubricating oil.
[2] A proprietary combination detergent for lubricating oils consisting of a barium alkyl phenol sulfide having admixed therewith a calcium petroleum sulfonate.

Failure of the hydraulic lifter was evidenced by spalling of the lifter surface. If the lifter surface had flaked with no metal removal, it was considered to be an incipient failure.

In some instances this difficulty might be overcome by the use of certain proprietary oiliness agents. The solution to the problem is not that simple and requires more than the judicious selection of any well-known oiliness agent because of the critical relationship between a number of factors, such as the detergent and the oiliness agent employed in the lubricating oil formulation, the additive composition and various engine designs, and others.

It is, therefore, a primary object of this invention to provide an additive mixture, comprising a detergent and anti-wear agent, which effectively imparts anti-wear and detergency to a lubricating oil composition. It is a further object of this invention to provide an engine lubricating composition which has excellent anti-wear and rust-inhibiting characteristics. Another object of this invention is the formulation of an engine lubricating oil composition which substantially reduces the wear and sticking of hydraulic valve lifters, piston-ring wear, piston-ring sticking, especially under low temperature conditions, wear in cam followers and camshaft lobes, and avoids filling piston-ring grooves with sludge and varnish deposits. An additional object of this invention is the production of a motor oil composition which has minimum adverse effects on engine preignition tendencies. These and other objects will be made more apparent from the following detailed discussion of the instant invention.

According to this invention, it has been found that the addition of the combination of an oil-soluble, zinc salt of thiophosphoric acid esters and an oil-soluble, substituted-ammonia sulfonate to a lubricating oil composition having a high level of detergency overcomes the deleterious effect of the detergent level. The additive combination of this invention provides a lubricating oil having enhanced anti-wear properties which make it especially adaptable for use as a crankcase oil in high-output automotive engines.

In carrying out the primary objects of this invention the high level of detergency of the lubricating oil is provided by adding sufficient amounts of a detergent selected from the group of compounds which will keep oil-insoluble matter, such as oil-oxidation products, dirt, fuel soot, resins, etc., in suspension so that they will not settle out or adhere to metal surfaces to build up as sludge or varnish deposits. Types of detergents include, but are not liimted to, petroleum sulfonates or synthetic sulfonate salts where the cationic substituent of the sulfonate is an alkali metal, alkaline-earth metal, aluminum, tin, lead, etc., e. g., calcium petroleum sulfonate, basic barium salt of wax-substituted naphthalene sulfonate, sodium keryl benzene sulfonate; the alkaline-earth metal alkyl phenol sulfides, e. g., barium amyl phenol sulfide, basic barium dibutyl phenol sulfide, calcium octyl phenol disulfide, calcium dicetyl phenol sulfide; metal salts of phenol, e. g., aluminum dicetyl phenate; as well as the metal salts of wax-substituted phenol derivatives which are rather complex molecules prepared by attaching one or more long-chain, paraffin-wax molecules to a hydroxy aromatic ring nucleus which then may be carboxylated. A normal or basic metal salt is then formed by attachment to the hydroxyl and/or the carboxyl groups. Examples of suitable phenates and metal salts of wax-substituted phenol derivatives are disclosed in U. S. patent 2,197,833 and others. Metal salts of phosphorus derivatives may also be used as the detergent component of the subject composition. Alkaline-earth metal derivatives of phosphorus-sulfide-treated, high-molecular-weight, saturated or unsaturated carboxylate esters such as lard oil, sperm oil, degras, etc., exhibit detergent properties. A number of dithiophosphates having the formula $(RO)_2PSSM$ where R is an organic radical, e. g., lauryl, octyl, cyclohexyl, etc., and M is one equivalent of an alkaline-earth metal, such as zinc, etc., as well as the alkaline-earth metal derivatives of the reaction product of an unsaturated hydrocarbon and a phosphorus sulfide, e. g., potassium salt of a $P_2S_5$-polybutene, are also applicable in the instant invention.

In view of the fact that a number of detergents have a limited detergency action, it may be desirable to incorporate two or more detergents into the composition, not only to enhance the potency of the detergency action but also to take advantage of the bearing protection and anti-oxidation properties of these additives. For example, such a detergent combination is exemplified by an alkaline-earth metal alkyl phenol sulfide-petroleum sulfonate combination, i. e., barium amyl phenol sulfide-calcium petroleum sulfonate. Other combinations are disclosed in U. S. Patents 2,280,419; 2,346,154; 2,369,632; 2,420,893, and others. This type of additive composition is referred to in the appended claims as a combination detergent. As has been shown in the example above, the presence of detergents in amounts of about 3% by weight of the lubricating oil composition has an inimical effect on the inherent anti-wear characteristics of the lubricating oil. The instant invention is directed to overcoming this inimical effect in compounded lubricating oils when amounts of detergent which have a detrimental influence on the anti-wear characteristics of the crankcase lubricant are employed in the composition. In general, between 2% and 8% by weight of the detergent may be used in the formulation of crankcase lubricants for high-output engines. However, in some instances it may be desired to employ amounts outside this range.

The anti-wear agent which is added to the lubricating oil to overcome the depreciation in anti-wear due to the high level of detergency of the subject lubricating oils consists essentially of an oil-soluble, zinc salt of thiophosphoric acid ester and an oil-soluble, substituted-ammonium sulfonate.

Salts which constitute the former constituent of the anti-wear additive are those esters of thiophosphoric acid having the general formula $$(RO)_2PSSZn$$

where R is an organic radical, and Zn is one equivalent of zinc. Although other techniques are available, in general, these substances are formed by reacting organic hydroxy compounds with phosphorus pentasulfide to form esters. The resulting esters are acidic and readily form salts with metallic bases, usually a metal oxide, hydroxide, sulfide, or carbonate. The zinc salts of the higher molecular weight members are soluble in hydrocarbon oils. It is preferred that the said organic radical have 5–40 carbon atoms in order to facilitate the dissolution of the zinc dithiophosphate in the oleaginous base. This organic radical may be alkyl, aryl, cycloalkyl, aralkyl, a combination of these, or others. Examples of suitable dithiophosphates include but are not limited to zinc salts of dihexyl dithiophosphate, dicapryl dithiophosphate, dilauryl dithiophosphate, distearyl dithiophosphate, diphenyl dithiophosphate, dinaphthyl dithiophosphate, di(2,4-dioctyl) dithiophosphate, dicetyl diphenyl dithiophosphate, di(wax-substituted naphthyl) dithiophosphate, dicyclohexyl dithiophosphate, dicyclopentyl dithiophosphate, di(amylcyclohexyl) dithiophosphate, hexylcapryl dithiophosphate, naphthyllauryl dithiophosphate, amyl cyclohexyl dithiophosphate, methyl cyclohexyl dithiophosphate.

The multifunctional characteristics of dithiophosphates, which permit them to serve as corrosion inhibitors, antioxidants, detergents, and E. P. agents in lubricating oil compositions, are well known. However, in spite of such uses of these substances, they will not function per se in all engines to overcome depreciation in anti-wear characteristics resulting from use of a crankcase oil having a high detergency level. It has been found, however, that the use of small amounts of an oil-soluble, substituted-ammonia sulfonate together with a zinc dithiophosphate will function to mitigate wear occurring through the use of crankcase oils having a high level of detergency. The sulfonates which may be used in the composition of this invention are those oil-soluble, sulfonic acids which have been neutralized with a nitrogenous base such as ammonia, ammonium hydroxide, primary, secondary and tertiary amines, etc., to produce an ammonium, or organic substituted-ammonium salt of sulfonic acid. In the appended claims it is intended that the expression "ammonium sulfonate" also include organic substituted-ammonium compounds. The sulfonic acid may be derived by the conventional sulfonation of a suitable organic compound to produce a high-molecular-weight sulfonic acid that is oil-soluble. A number of suitable organic sulfonic acids are disclosed in the prior art. Especially adaptable for use in this invention are the oil-soluble petroleum sulfonic acids, or mahogany sulfonic acids. Synthetic acids also may be used, and can be prepared by first alkylating an aromatic nucleus such as benzene, naphthalene, etc., with an alkyl substituent derived from paraffin-wax. The alkaryl compound is then sulfonated with fuming sulfuric acid. The oil-soluble, sulfonic acid employed is then neutralized with a nitrogenous base which may be, but is not limited to, ammonia, ammonia hydroxide, hexyl-amine, dodecyl amine, abietyl-amine, dehydroabietyl amine, amine mixtures such as those marketed by Armour & Co. under the mark "Armeens," and others. Typical sulfonates are exemplified by ammonium petroleum sulfonate, dehydroabietyl ammonium petroleum sulfonate, capryl ammonium wax-substituted naphthalene sulfonate, stearyl ammonium petroleum sulfonate, and others.

In formulating a crankcase oil having a high level of detergency using the teachings of this invention, about 2 to 8% by weight of detergent, based on total motor oil composition, is preferred. The optimum amount to be employed should be determined experimentally. In general, amounts within the preferred range will be effective. However, amounts outside this range may be necessary.

The proportion of the zinc dithiophosphate which may be added may vary. As little as 0.4% by weight may be added. However, 0.5 to 1.00% by weight of zinc dithiophosphate is preferred, although amounts in excess of this may be utilized.

The amount of ammonium or organic substituted-ammonium sulfonate which is effective in the anti-wear composition additive of this invention is one part by weight to about 3 to 10 parts by weight of the zinc dithiophosphate substituent. Although amounts in excess of this may be employed, the enhanced effect in mitigating wear may not be as pronounced.

Engine wear is generally evaluated by means of procedures recommended by the engine manufacturers. One such test is the Cadillac 100-hour cold-cycle test. In this test a production model Cadillac automobile engine is assembled, employing new camshafts and hydraulic valve lifters for each test. The valve lifter lengths prior to installation are measured to the nearest 0.0001 in. after standing at a constant temperature of 75° F. for 12 hours. The engine is then operated, employing two cycles of operating conditions. In the first cycle the engine is run for two hours at the following speeds:

(a) 15 minutes at 1000 R. P. M.
(b) 30 minutes at 1500 R. P. M.
(c) 30 minutes at 1800 R. P. M.
(d) 45 minutes at 2000 R. P. M.

During the first cycle, the engine is operated employing a water-coolant in the water-jacket having an outlet temperature of 165° F. The oil-sump temperature is maintained at 190–200° F. After the engine has operated for two hours in the first cycle, the engine is shut down for another two hours, during which time the cooling water is circulated through the water-jacket of the engine block. The temperature of this cooling water is about 55–65° F. After this period, cycle two is initiated and the engine is run at two hours at a speed of 1000 R. P. M. The temperature of the coolant in the water-jacket is reduced to 100° F., which results in an oil-sump temperature of about 120° F. Thereafter, the engine is again shut down for two hours with the cooling water at a temperature of about 55–65° F. circulating through the block. The second cycle is then repeated until 25 cycles have been completed. The engine is then dissassembled and the camshafts and hydraulic valve lifters examined for wear. Again the parts which are to be measured are stored at a constant temperature of about 75° F. for 12 hours before the wear is measured. The results of a number of runs employing this test, compared to those from the Chevrolet engine test, show, in Table I, the marked differences between engines. Thus, no deleterious effects occurred in the Cadillac engine, but the engine did not require the composition of this invention and no marked improvements were observed. However, the deleterious affect of the detergent on the anti-wear characteristics of the base oil is clearly evidenced.

*Table I*
CADILLAC 100-HOUR COLD-CYCLE TESTS

| Composition, Weight Percent | Lifter Wear | | |
|---|---|---|---|
| | Minimum | Maximum | Average |
| 97.0 lubricating oil base<br>2.5 detergent [1]<br>0.5 zinc diamyl thiophosphate | .0004 | .0007 | .0005 |
| 96.9 lubricating oil base<br>2.5 detergent [1]<br>0.5 zinc diamyl thiophosphate<br>0.1 dehydroabietylammonium petroleum sulfonate | .0003 | .0010 | .0005 |
| 97.0 lubricating oil base<br>3.0 detergent [1] | .0007 | .0023 | .0015 |

[1] A proprietary combination detergent for lubricating oils, consisting of a barium alkyl phenol sulfide having admixed therewith a calcium petroleum sulfonate.

The hereinbefore described Cadillac test is essentially a low temperature test run under conditions conducive to corrosion due to the formation of acidic products and their accumulation in the crankcase oil.

To demonstrate the effectiveness of the composite anti-wear agent of this invention, the base lubricating composition was tested using the Chevrolet L-S-5 procedure. In conducting this test a current model Chevrolet automobile engine is employed. The engine is mounted in a cnoventional dynamometer test stand. The valve-operating mechanism of the engine is modified slightly by increasing the valve spring tension to 240 pounds at full valve opening. Thus modified, the engine is operated under the following conditions:

Speed _____ 3150 R. P. M.
Load _____ 30 brake-horsepower.
Oil sump _____ 255° F.

Cooling water—
   In _____ 190° F.
   Out _____ 200° F.
Test duration _____ 24 hours.

A new camshaft, valve lifters, and rocker-arm assembly are installed for each test. Upon completion of the test the engine is disassembled and the various elements of the valve-operating mechanism are inspected. Results of this test are tabulated in Table II.

*Table II*

CHEVROLET L-S-5 TESTS

| Composition—Weight Percent | Failed Lifters | Incipient Lifter Failures | Failed Cam Lobes |
|---|---|---|---|
| 97.0 lubricating oil base<br>3.0 detergent [1] | 6 | 0 | 6 |
| 96.0 lubricating oil base<br>3.0 detergent [1]<br>1.0 benzo phenone | 5 | 0 | |
| 96.0 lubricating oil base<br>3.0 detergent [1]<br>1.0 benzonitrile | 6 | 1 | 3 |
| 96.0 lubricating oil base<br>3.0 detergent [1]<br>1.0 oleone | 6 | 0 | 5 |
| 97.0 lubricating oil base<br>2.5 detergent [1]<br>0.5 zinc diamyl dithiophosphate | 5 | 0 | 3 |
| 96.9 lubricating oil base<br>2.5 detergent [1]<br>0.5 zinc diamyl dithiophosphate<br>0.1 ammonium petroleum sulfonate | 1 | 0 | 0 |
| 96.9 lubricating oil base<br>2.5 detergent [1]<br>0.5 zinc diamyl dithiophosphate<br>0.1 rosin amine petroleum sulfonate | 1 | 0 | 1 |

[1] A proprietary combination detergent for lubricating oils, consisting of a barium alkyl phenol sulfide having admixed therewith a calcium petroleum sulfonate.

Comparative data shown in Table II illustrate the effect of a base oil having a high level of detergency on engine wear. Also shown is the ineffectiveness of an exemplary zinc dithiophosphate per se to ameliorate this wear. The essence of the invention is then illustrated by results demonstrating the substantial improvement effected by the addition of small amoutns of an ammonium sulfonate to the high detergency base oil containing the exemplary zinc dithiophosphate. Evidence of the empirical nature of the wear problem solved by the instant invention is the data showing the inability of conventional anti-wear agents to overcome the wear caused by the high detergency base oil.

The oleaginous lubricating constituent of the blend may be any solvent-refined or conventionally-refined hydrocarbon oil or lubricating oil derived from petroleum oils produced from a Pennsylvania, Mid-Continent, Coastal or other source. The composition of the base oil will depend upon the desired viscosity requirements of the finished lubricating oil blend and may be prepared from a single fraction or admixture of several lubricating oil fractions employed to take advantage of the well-known blending phenomenon. In addition, amounts of extract oil obtained in the solvent-refining of lubricating oil fractions may also be employed in preparing the mineral oil base. Inasmuch as various synthetic oils also may lack sufficient anti-wear qualities, these substances may be used as the oleaginous constituent of the blend. Examples of these lubricants include polyalkylene glycols such as those marketed by Union Carbide & Carbon under the mark "Ucon," and the esters of dibasic acid, such as di-2-ethyl hexyl sebacate. It is to be noted that the particular oleaginous lubricant employed as the base oil is not considered critical since a plurality of them may be improved in accordance with this invention.

This invention is especially adaptable for use in so-called multigraded oils which are crankcase lubricants which satisfy the requirements of a range of S. A. E. viscosity characteristics. The use of multigraded lubricating oils make it possible to obtain maximum flexibility of operation in the automobile engine irrespective of crankcase temperatures encountered.

In the preparation of a compounded lubricating oil suitable for use as an engine lubricant it may be desirable to add other functional additives to the base composition in order to impart beneficial properties in which the oleaginous base may be deficient. For example, viscosity index improvers may be employed. Examples of viscosity index improvers which may be used include polyisobutylene derivatives, polymerized esters of the acrylic acids and higher fatty alcohols, and mixtures of these esters, said esters having a molecular weight of from about 5,000–20,000, such as methyl alkyl methacrylate polymers, and the alkyl styrene polymers formed from styrene and olefins having 8–12 carbon atoms per molecule. In addition, a pour point depressant may also be added to the composition if needed. Suitable additives available for this purpose include the various polymerization and condensation products, such as the condensation product derived from the reaction between a phenol and a chlorinated wax ester or polymerized esters of the acrylic acid series which function as pour-point depressants. Also, anti-foam agents such as the silicone polymers (polymethyl siloxanes) or others may be used if the composition exhibits foaming tendencies.

Although the zinc dithiophosphate component of the anti-wear agent is multifunctional in nature and will impart oxidation resistance to the oleaginous base in which it is used, it may be desirable to employ other anti-oxidants in the compounded lubricant in the event that a detergent not having anti-oxidation properties is employed.

Crankcase oils compounded according to the instant invention and satisfactory for use in the lubrication of high-output automotive engines will have the following formula:

*Table III*

| Component | SAE Grade Oil | | | |
|---|---|---|---|---|
| | 5W-20 | 10W-30 | 10 | 10W |
| | Proportions, percent by weight | | | |
| MCSR [1] Neutral, 170 SUS at 100° F | 10.0 | 87.4 | | |
| MCSR [1] Neutral, 85 SUS at 100° F | 77.7 | | 74.9 | 74.7 |
| MCSR [1] Bright Stock, 150 SUS at 210° F | | | 22.0 | 22.0 |
| Solvent extract obtained in production of MCSR 85 Vis. Neutral | 4.0 | 4.5 | | |
| Detergent [2] | 2.5 | 2.5 | 2.5 | 2.5 |
| Zinc diamyl dithiophosphate | 0.5 | 0.5 | 0.5 | 0.5 |
| Ammonium petroleum sulfonate | 0.1 | 0.1 | 0.1 | 0.1 |
| Pour Point Depressant and V. I. Improver [3] | | | | 0.2 |
| Pour Point Depressant and V. I. Improver [4] | 5.2 | 5.0 | | |

[1] A lubricating oil base produced by the solvent-refining of a Mid-Continent base lubricating oil stock.
[2] A proprietary combination detergent for lubricating oils, consisting of a barium alkyl phenol sulfide having admixed therewith a calcium petroleum sulfonate.
[3] A high molecular weight polymeric ester (10,000–15,000) of methacrylic acid and higher fatty alcohols, e. g., lauryl, cetyl, and octyl, having a viscosity of 23,000 SUS at 100° F. and a viscosity of 3,200 SUS at 210° F.
[4] A high molecular weight polymeric ester (10,000–20,000) of methacrylic acid and higher fatty alcohols, e. g., lauryl, cetyl, and octyl, having a viscosity of 43,000 SUS at 100° F. and a viscosity of 3,700 SUS at 210° F.

It is thus seen that a compounded motor oil composition has been described which is especially effective in reducing wear and friction in an internal combustion engine, particularly in the valve train assembly. It is obvious that other mineral oil compositions other than those specifically illustrated above may be formulated using the instant invention and such modifications are within the scope of the instant invention.

Accordingly, we claim:

1. A crankcase lubricant having the following composition:

| Component: | Weight, percent |
|---|---|
| An oleaginous lubricating oil base | 97.8–86.5 |
| High molecular weight polymeric esters of methacrylic acid and the higher fatty alcohols | 0.1–7.5 |
| Barium dibutyl phenol sulfide admixed with calcium petroleum sulfonate | 1.5–4.0 |
| Zinc organic - substituted dithiophosphate having the general formula: (RO)$_2$PSSZn where R is a hydrocarbon substituent having 5–40 carbon atoms | 0.5–1.0 |
| Oil-soluble ammonium sulfonate selected from the group consisting of petroleum mahogany sulfonates and alkaryl sulfonates | 0.1–1.0 |

2. A composition in accordance with claim 1 in which the ammonium sulfonate is ammonium petroleum sulfonate.

3. A composition in accordance with claim 1 in which the zinc dithiophosphate is zinc diamyl dithiophosphate.

4. A motor oil composition for the lubrication of a spark-ignited, internal combustion engine comprising a major portion of a petroleum lubricating oil base and minor but sufficient amounts of an oil-soluble, metal salt detergent, which will keep oil-insoluble materials including oil oxidation products, dirt, fuel soot, and resins in suspension in said composition, to impart "a high level of detergency" to said composition and produce a depreciation in the anti-wear characteristics of said composition, and containing an anti-wear composite additive consisting of 0.4–1%, by weight, based on said composition, of an oil-soluble zinc salt of a dithiophosphoric acid having the general formula:

$$(RO)_2PSSZn$$

where R is a hydrocarbon substituent having 5–40 carbon atoms and an oil-soluble ammonium sulfonate selected from the group consisting of petroleum mahogany sulfonates and alkaryl sulfonates in the weight ratio of 1 part of said sulfonate per 3–10 parts of said zinc salt.

5. A motor oil composition for the lubrication of a spark-ignited, internal combustion engine comprising a major portion of a petroleum lubricating oil base and minor but sufficient amounts of an oil-soluble, metal salt detergent, which will keep oil-insoluble materials including oil oxidation products, dirt, fuel soot, and resins in suspension in said composition, to impart "a high level of detergency" to said composition and produce a depreciation in the anti-wear characteristics of said composition, said detergent being a combination detergent consisting of a plurality of oil-soluble, metal detergents, and containing an anti-wear composite additive consisting of 0.4–1%, by weight, based on said composition, of an oil-soluble zinc salt of a dithiophosphoric acid having the general formula:

$$(RO)_2PSSZn$$

where R is a hydrocarbon substituent having 5–40 carbon atoms, and an oil-soluble ammonium sulfonate selected from the group consisting of petroleum mahogany sulfonates and alkaryl sulfonates in the weight ratio of 1 part of said sulfonate per 3–10 parts of said zinc salt.

6. A motor oil compisition for the lubrication of a spark-ignited, internal combustion engine comprising a major portion of a petroleum lubricating oil base and 2–8% by weight, based on said composition, of an oil-soluble, metal salt detergent, which will keep oil-insoluble materials including oil oxidation products, dirt, fuel soot, and resins in suspension in said composition, to impart "a high level of detergency" to said composition and produce a depreciation in the anti-wear characteristics of said composition, said detergent consisting of a combination of a metal salt of an alkyl phenol sulfide and an alkaline earth metal sulfonate, and containing an anti-wear composite additive consisting of 0.4–1%, by weight, based on said composition of an oil-soluble zinc salt of a dithiophosphoric acid having the general formula:

$$(RO)_2PSSZn$$

where R is a hydrocarbon substituent having 5–40 carbon atoms, and an oil-soluble ammonium sulfonate selected from the group consisting of petroleum mahogany sulfonates and alkaryl sulfonates in the weight ratio of 1 part of said sulfonate per 3–10 parts of said zinc salt.

7. A motor oil composition for the lubrication of a spark-ignited, internal combustion engine comprising a major portion of a petroleum lubricating oil base and 2–8% by weight, based on said composition, of an oil-soluble, metal salt detergent, which will keep oil-insoluble materials including oil oxidation products, dirt, fuel soot, and resins in suspension in said composition and produce a depreciation in the anti-wear characteristics of said composition, said detergent consisting of a combination of a metal salt of an alkyl phenol sulfide and an alkaline earth metal sulfonate, and containing an anti-wear composite additive consisting of 0.4–1%, by weight, based on said composition, of an oil-soluble zinc salt of a dithiophosphoric acid having the general formula:

$$(RO)_2PSSZn$$

where R is an alkyl substituent having 5–40 carbon atoms per molecule, and an oil soluble, ammonium, petroleum mahogany sulfonate in the weight ratio of 1 part of said sulfonate per 3–10 parts of said zinc salt.

8. A composition in accordance with claim 7 in which said zinc salt is zinc diamyl dithiophosphate.

9. A motor oil composition for the lubrication of a spark-ignited, internal combustion engine comprising a major portion of a petroleum lubricating oil base and 2–8% by weight, based on said composition, of an oil-soluble, metal salt detergent, which will keep oil-insoluble materials including oil oxidation products, dirt, fuel soot, and resins in suspension in said composition, to impart "a high level of detergency" to said composition and produce a depreciation in the anti-wear characteristics of said composition, said detergent being a combination of a barium amyl phenol sulfide and calcium petroleum sulfonate, and containing an anti-wear composite additive consisting of 0.4–1% by weight, based on said composition, of zinc diamyl dithiophosphate, and 1 part by weight per 3–10 parts by weight of said zinc dithiophosphate, of ammonium petroleum sulfonate.

References Cited in the file of this patent
UNITED STATES PATENTS

| 2,352,669 | Van Ess | July 4, 1944 |
| 2,369,632 | Cook | Feb. 13, 1945 |
| 2,417,876 | Lewis | Mar. 25, 1947 |